United States Patent
Huynh-Thu et al.

(10) Patent No.: US 8,243,143 B2
(45) Date of Patent: Aug. 14, 2012

(54) METHOD AND APPARATUS FOR GENERATION OF A VIDEO QUALITY PARAMETER

(75) Inventors: Quan Huynh-Thu, Ipswich (GB); Benjamin Pernot, Ipswich (GB)

(73) Assignee: Psytechnics Limited, Ipswich (GB)

( * ) Notice: Subject to any disclaimer, the term of this patent is extended or adjusted under 35 U.S.C. 154(b) by 561 days.

(21) Appl. No.: 12/427,204

(22) Filed: Apr. 21, 2009

(65) Prior Publication Data
US 2009/0273678 A1   Nov. 5, 2009

(30) Foreign Application Priority Data
Apr. 24, 2008 (EP) .................................. 08103719

(51) Int. Cl.
*H04N 17/00* (2006.01)
(52) U.S. Cl. ........................................ 348/180; 348/190
(58) Field of Classification Search .................. 348/180, 348/181, 184, 189, 190, 559, 553; 382/209; H04N 17/00, 17/02, 5/44
See application file for complete search history.

(56) References Cited

U.S. PATENT DOCUMENTS
2002/0105597 A1 *  8/2002  Janko et al. ................... 348/180
2009/0128633 A1 *  5/2009  Chapman ...................... 348/180

FOREIGN PATENT DOCUMENTS
| JP | 2002-290998 | 10/2002 |
| WO | WO 2006/103327 | 10/2006 |
| WO | WO 2007/071076 | 6/2007 |
| WO | WO 2007/118160 | 10/2007 |

OTHER PUBLICATIONS

Pastrana-Vidal et al., *Métrique Perceptuelle des Rupture de Fluideté Vidéo sans Référence*, Conference Coresa, BNSDOCID XP 002354701A, May 26, 2004, 4 pages.
Watanabe et al., *Objective video quality assessment method for evaluating effect of freeze distortion in arbitrary video scenes*, SPIE-IS&T, vol. 6494 6494OP, Jan. 2007, 8 pages.
Yang, K.C. et al, "Perceptual Temporal Quality Metric for Compressed Video," *IEEE Transactions on Multimedia*, Nov. 2007, pp. 1528-1535, vol. 9, No. 7.

* cited by examiner

*Primary Examiner* — Sherrie Hsia
(74) *Attorney, Agent, or Firm* — Fenwick & West LLP

(57) ABSTRACT

This invention provides a parameter for use in assessing video quality based on temporal frame freezing for use in an apparatus and method for perceptual video quality measurement. The invention provides a method of generating a freeze frame parameter relating to the perceptual impact of frozen frames in a video signal comprising the steps of: identifying frozen frames; identifying a freeze event comprising a plurality of consecutive frozen frames, the freeze event having a duration in dependence upon the number of frozen frames in said sequence; defining a set of duration ranges; and generating a freeze frame parameter in dependence upon the number of freeze events having a duration falling within each duration range. Methods and apparatus for perceptual video quality measurement using the method are also provided.

12 Claims, 4 Drawing Sheets

METHOD AND APPARATUS FOR GENERATION OF A VIDEO QUALITY PARAMETER

BACKGROUND a. Field of the Invention

In the transmission of video, the different processes involved in the encoding, transmission and decoding of the video signal usually introduce quality impairments.

The present invention relates to an apparatus and method for perceptual video quality measurement. The quality measurement may be achieved by making a comparison between a reference signal and a degraded signal, or may be based on the degraded signal alone. In particular this invention provides a parameter for use in assessing video quality based on temporal frame freezing.

b. Related Art

Patent Application No WO2006103327 describes a method to measure the quality degradation of a video impaired by frame dropping. A model is proposed for predicting quality decrease due to frame dropping in which the impact of the overall degradation is modeled as an integration (summation) of the individual effects. This model combines the quality function for a single burst of dropped frames, the density of discontinuities for several bursts of dropped frames and a power function varying with the burst density. The overall quality of the processed video is expressed as the quality of the reference video minus the overall contribution of all the temporal frame dropping. The overall contribution in turn is expressed as the sum of individual degradation contribution $d_t$ for each burst of duration t. $d_t$ is expressed as a power function depending on the distribution of burst duration and the quality function for an isolated burst of dropped frames having duration t. The total duration of the video is not taken into account to calculate the effect of the temporal distortions.

In K. Watanabe, J. Okamoto, T. Kurita, "Objective video quality assessment method for freeze distortion based on freeze aggregation", in Proceedings of SPIE Conference on Image Quality and Systems Performance III, San Jose, January 2006, vol. 6059 a method is proposed to derive an objective video quality measure from the length of a freezing impairment. In the case where there is only one freezing event occurring in a video, the quality is computed as a logarithmic function of the duration of the freezing event. In the case of several freezing events occurring in the video, the durations of the multiple events are aggregated into one equivalent freeze distortion. Subsequently, an objective video quality measure is computed as a logarithmic function of the equivalent freeze distortion. The method considers the total length of all freeze distortions as the length of the equivalent single freeze distortion. In this method, an individual freeze length is restricted to be a power of 2, e.g. 2, 4, 8, 16, 32, 64.

In K-C. Yang, C. C. Guest, K. El-Maleh, P. K. Das, "Perceptual temporal quality metric for compressed video", in IEEE Transactions on Multimedia, vol. 9, no. 7, pp. 1528-1535, November 2007 and patent application No WO2007118160A1, a temporal quality metric (PTQM) for evaluating the perceptual impact of frame dropping is proposed. The method maps the number of dropped frames in the video to a local temporal quality metric and uses the variation of this local temporal quality to estimate a global temporal quality for the video sequence. A scene change detector is first applied to detect segments of the video with similar motion activity. A dropping severity estimator s is computed for each frame dropping event in each video segment based on the length of consecutive frames dropped. If no frame is dropped in the segment then s=0, otherwise s increases towards 1 as the length corresponding to the number of consecutive dropped frames increases. Motion activity in each scene is computed based on the average size of valid motion vectors, where valid motion vectors are those with a value above a pre-defined threshold. The motion activity of the scene is used to adjust the dropping severity estimator of each dropping event according to the rule that higher motion activity leads to higher temporal quality degradation. The motion mapped dropping severity for the event is then adjusted in relation to the average motion mapped dropping severity of the 3 preceding frames. If no information exists for previous frames (e.g. beginning of a scene) then a forward scanning window is used instead. A non-linear Temporal Quality Fluctuation (TQF) function is then applied such that the lower the frame rate of the segment of the video, the higher the non-linearity relationship. The TQF is then converted into a temporal quality metric q for each dropping event using a multiplicative transformation. The temporal quality for each scene is computed as the average of the temporal quality corresponding to each dropping event in the scene. The overall temporal quality metric for the video is then computed as the average across scenes.

In patent application WO2007071076A1, a temporal quality analysis is performed as part of a no-reference video quality metric. The temporal quality metric is derived from the percentage of frozen frames in the video, where frozen frames are only considered if not caused by frame rate downsampling.

The present invention provides an improvement on the above methods. The invention differs from the prior art referred to in the way that the different contributions of individual impairment (freeze) events are accounted for and in the way that a single most perceptually dominant impairment is transformed into a quality metric. Instead of integrating the contributions of all the different impairment events of all different durations, the present invention identifies the impairment duration that contributes mostly to the quality degradation to measure the overall quality degradation and discards impairment events of all other durations. In order to identify which of the impairment durations contributes most to the overall video quality, each individual impairment duration and its total accumulated duration over the video are transformed into a temporal quality metric. Based on the individual values of the temporal quality metric for each impairment duration, one of them is selected. The present invention takes into account both the influence of the individual duration of the impairment and the total accumulated duration of all impairments of that same individual duration, as well as their relative value to the total duration of the video sequence. Furthermore, the present invention also uses the length of the video signal so that the contribution of the degradation is made relative to the total video duration.

SUMMARY OF THE INVENTION

According to the invention there is provided a method of generating a freeze frame parameter relating to the perceptual impact of frozen frames in a video signal comprising the steps of: identifying frozen frames; identifying a freeze event comprising a plurality of consecutive frozen frames, the freeze event having a duration in dependence upon the number of frozen frames in said sequence; defining a set of duration ranges; and generating a freeze frame parameter in dependence upon the number of freeze events having a duration falling within each duration range.

Preferably, the step of generating a freeze frame parameter comprises the sub-steps of: determining a set of total durations comprising a total duration for each duration range by determining the total duration of all freeze events having a duration falling within said duration range; and generating said freeze frame parameter in dependence upon said set of total durations.

In a preferred embodiment the step of generating a freeze frame parameter in dependence upon said set of total durations comprises the sub-steps of: normalising each of said set to generate a normalised total duration in dependence upon the total duration of the video signal prior to generating said freeze frame parameter.

Preferably, the step of generating a freeze frame parameter in dependence upon said set of total durations comprises the sub-steps of: determining a set of candidate parameters comprising a candidate parameter $T_i$ for each duration range with index i by determining the candidate parameter of all freeze events having a duration falling within said duration range in dependence upon said normalised total duration $FrTotDurPercent_i$ for said duration range; determining a dominant candidate parameter; and generating said freeze frame parameter in dependence upon said dominant candidate parameter.

According to another aspect of the invention a freeze frame parameter as described above is used to generate a video quality measure in a method of video signal quality assessment and said quality measure may be stored for visual display and analysis.

An apparatus, a computer program and a computer readable medium carrying a computer program for performing the method of the invention are also provided.

DETAILED DESCRIPTION

Figure 1:
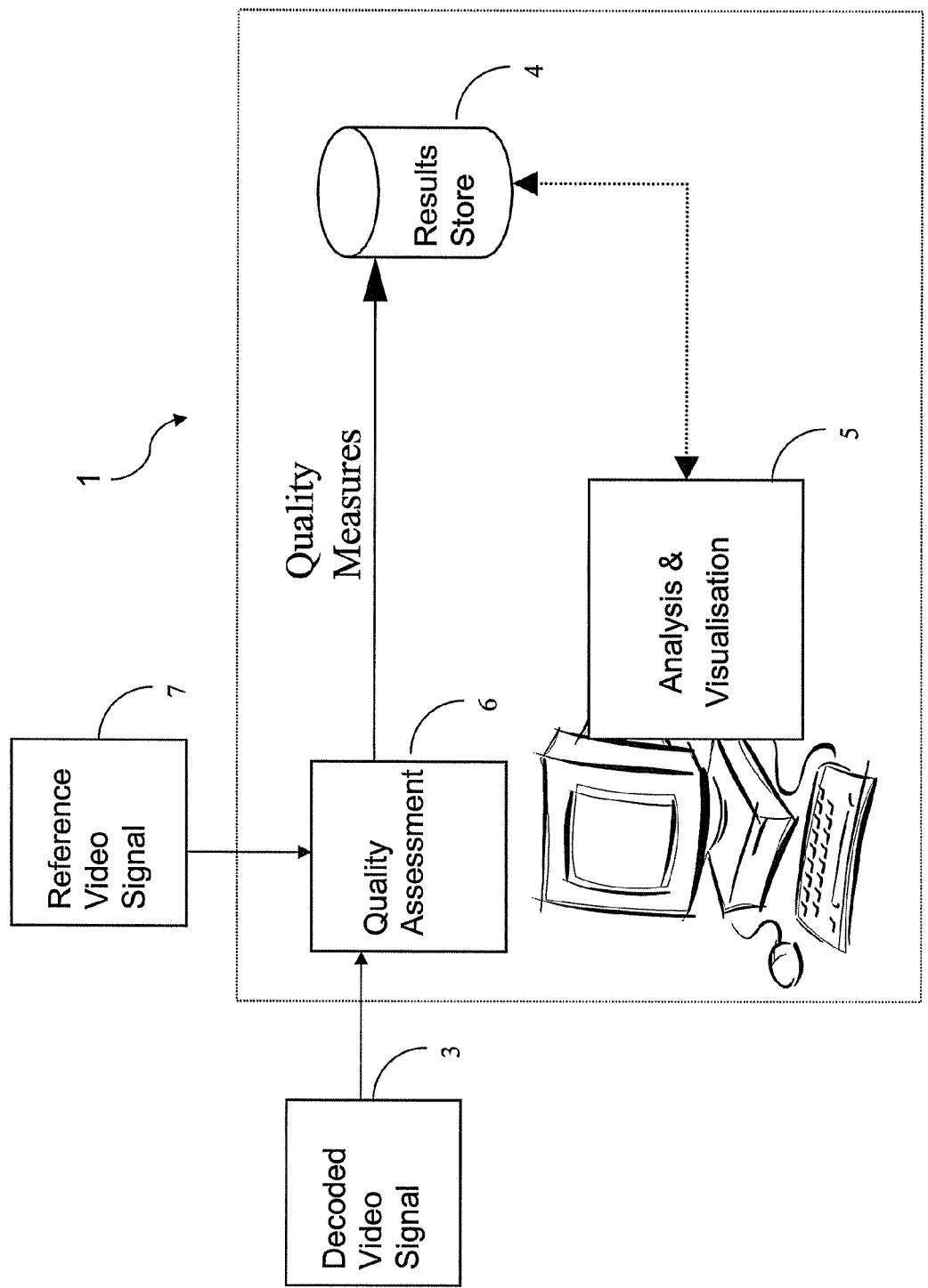
FIG. 1 is an illustration of a video quality assessment system.

Referring now to FIG. 1, a 'full-reference' video quality assessment system is described as such because a decoded video signal 3 is analysed alongside a reference video signal 7 by a quality assessment system 6. A 'no-reference' system relies on the decoded video signal 3 alone to carry out a quality assessment. Quality assessment results (in the form of mean opinion scores) are stored in a data store 4 for use in an analysis and visualisation module 5.

Figure 2:
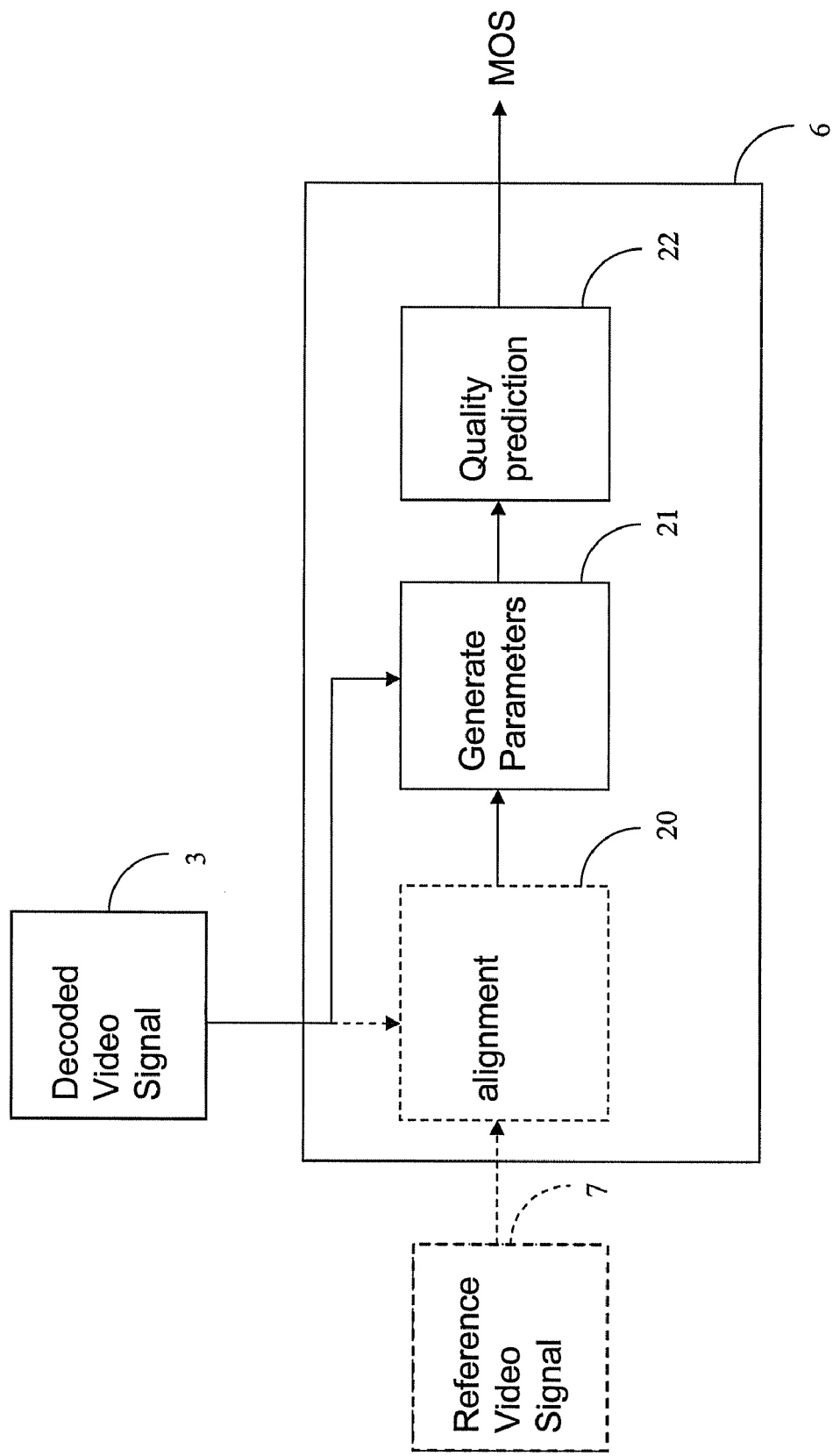
FIG. 2 is a block diagram illustrating the quality assessment module of FIG. 1 in more detail.

Referring now to FIG. 2, an original (reference) video signal 7 is encoded and transmitted via a telecommunications channel. In a full-reference system, it is assumed that reference video signal 7 and decoded video signal 3 are spatially and temporally aligned by an alignment module 20 prior to comparison of the reference video signal 7 and the decoded video signal 3. Such alignment is not relevant to the invention and is not discussed further here. In a full-reference system parameters are generated by parameter generation module 21 based on a comparison of the decoded video signal 3 and the reference video signal 7. In a no-reference system parameters are generated by parameter generation module 21 based on the decoded video signal 3 alone. Parameters are then used by quality prediction module 22 to generate a mean opinion score (MOS).

Quality prediction models typically produce a set of intermediate parameters from the input signal (or signals in the case of a full-reference model) such that each parameter changes in response to the presence and severity of one or more classes of image impairment. Said intermediate parameters are then combined to produce a single quality prediction value that correlates with the mean opinion score (MOS) that would be obtained for the decoded input signal when assessed by human subjects in a subjective experiment. The parameter combination step can be a simple weighted sum. Methods for optimising the relative weights of the parameters, like multivariable regression, are well known to those skilled in the art and are not directly relevant to the present invention. An example of a video quality prediction model that uses an intermediate set of parameters as described above is provided in Annex A of ITU-T Recommendation J.144, "Objective perceptual video quality measurement techniques for digital cable television in the presence of a full reference", with the weighted sum of the parameters performed according to Equation A.4-2. ITU-R Recommendation BT-500, "Methodology for the subjective assessment of the quality of television pictures" describes methods of performing subjective experiments for video signals.

Figure 3:
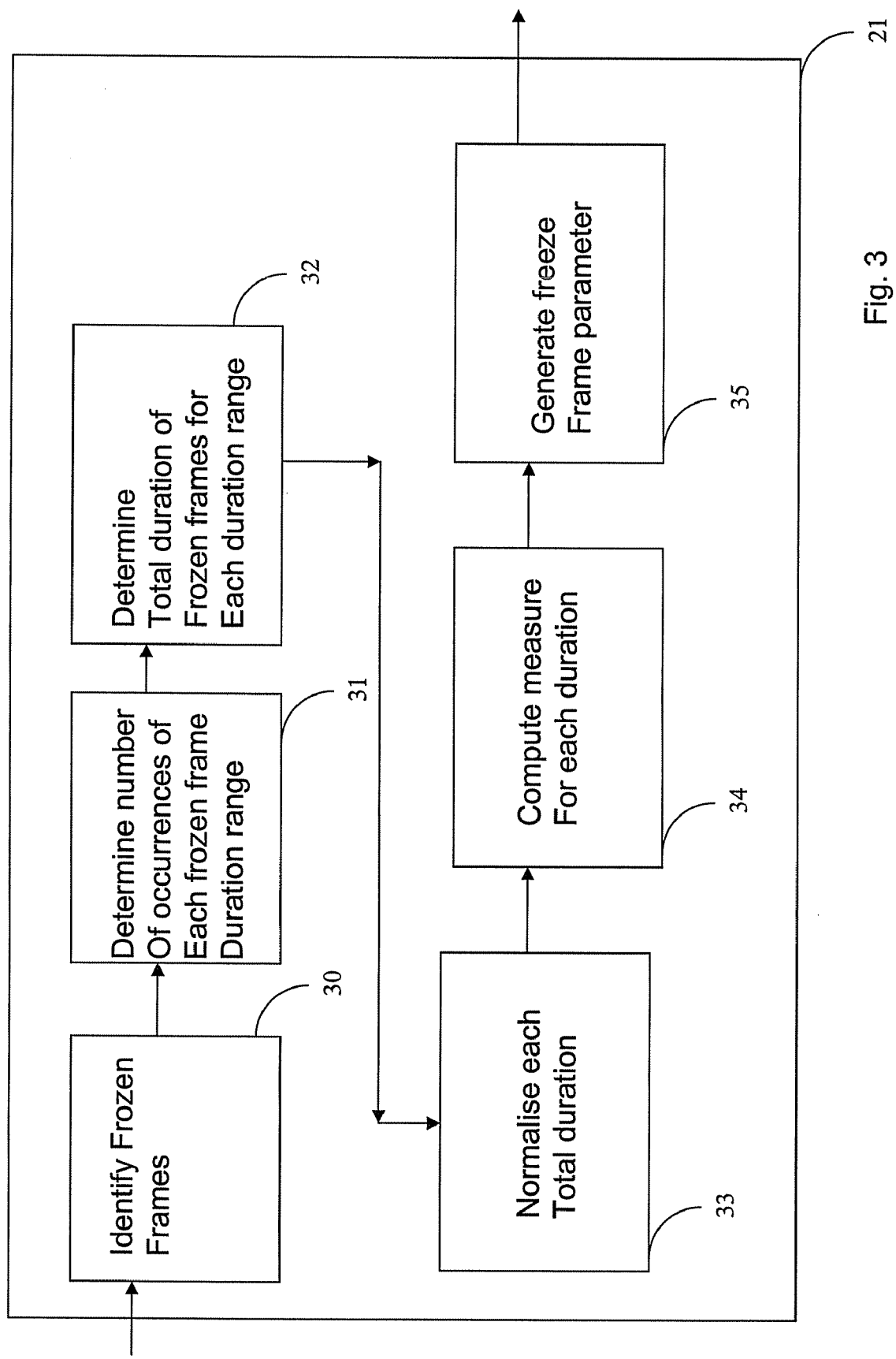
FIG. 3 illustrates the steps of a method according to the present invention.

FIG. 3 illustrates steps of a method used by parameter generation module 21 in accordance with the present invention to generate a frame freeze parameter. At step 30 frozen frames in the decoded video signal are identified and marked.

In a full-reference system the identification may be achieved using temporal alignment between the reference video signal and the decoded video signal. In a no-reference system a direct identification of frozen frames from the flow of frames in the decoded video signal is used.

In a no-reference system, detection of frozen frames is typically performed by determining the degree of similarity between successive frames. If the degree of similarity between two adjacent frames is very high, then the frames are classified as frozen. Measures of similarity that can be applied to two video frames are well known in the art and include mean square error (MSE), absolute error and cross-correlation.

In the case of a full-reference system, the detection of frozen frames can be augmented by checking the time-aligned reference video signal for periods of naturally occurring frame-freezes, and suppressing the classification of the corresponding frames in the degraded video signal as frozen.

Figure 4:
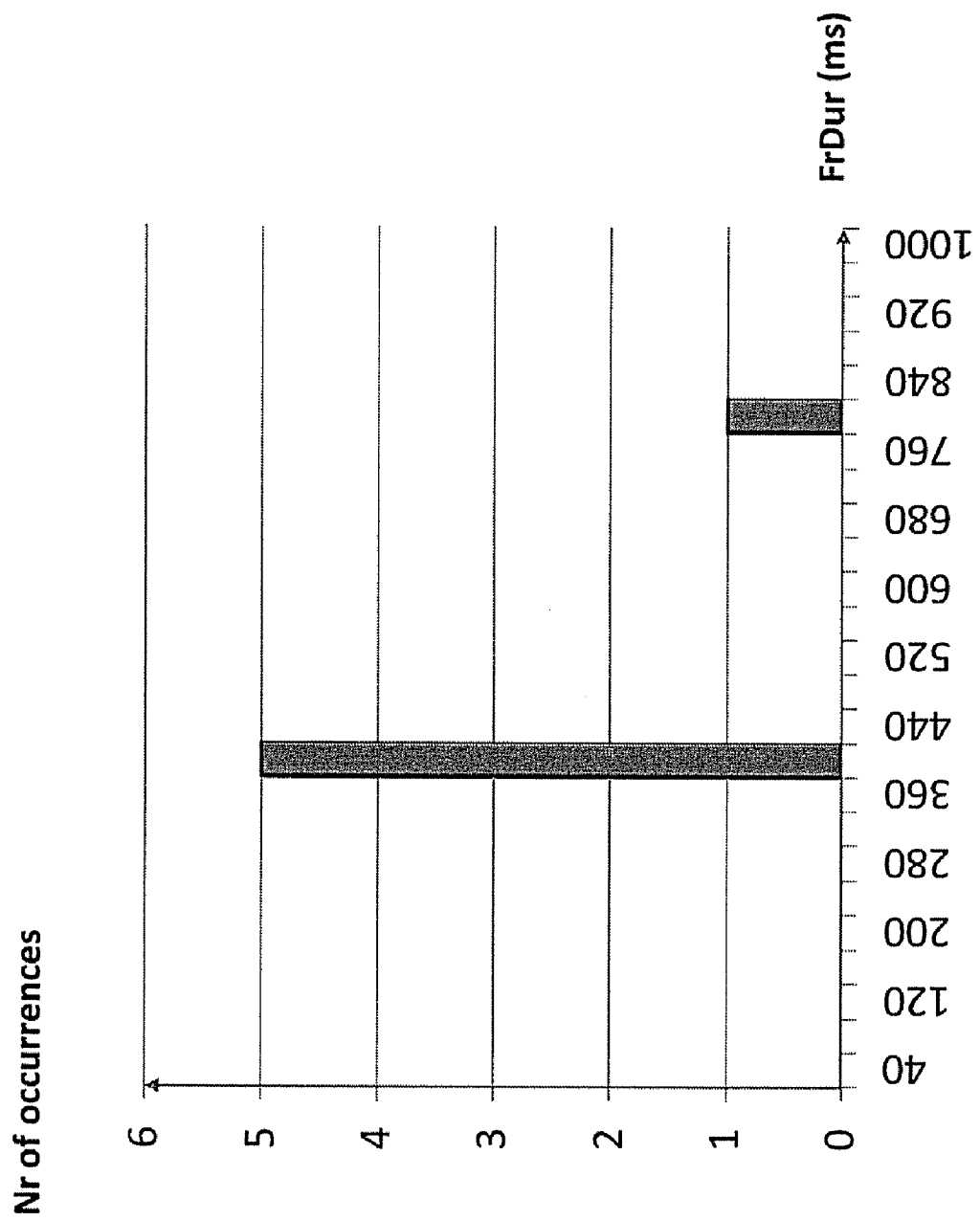
FIG. 4 is an illustrative histogram which may be used in the method of the present invention.

As will be understood by those skilled in the art, a histogram provides a count of a number of occurrences of an event falling into a particular category or range, and may be used to represent a distribution. In an embodiment of this invention a histogram representing the distribution of the duration of freeze events is created at step 31. In this histogram, each bin $FrDur_i$ represents the duration in milliseconds of an individual freeze event, where an individual freeze event is defined as a plurality of consecutive frozen frames and may be evaluated in terms of either the number of consecutive frozen frames or the duration of consecutive frozen frames taking into account the frame rate. FIG. 4 illustrates such a histogram where freeze events are evaluated in terms of the duration of each freeze event. It will be appreciate that each duration counted may represent freeze events falling into a range of durations, the smallest possible quantisation of the ranges being determined by the frame rate. In this example, an 8 second video signal at 25 frames per second exhibits five freeze events of duration 400 ms and one freeze event of duration 800 ms.

Referring back to FIG. 3, at step 32 the total duration FrTotDur$_i$ of freeze events having a particular duration with index i is calculated from the histogram by multiplying the value of each bin by its associated duration FrDur$_i$. Each bin may contain more than one freeze event. For example two freeze events each of 40 ms will have a total duration of 80 ms; two freeze events each of 100 ms will have a total duration of 200 ms.

At step 33 the duration values representing each bin and the total duration for each bin are normalised in relation to the total duration of the decoded video:

$$FrDurPercent_i = \frac{FrDur_i}{TotDur} * 100$$

and $$FrTotDurPercent_i = \frac{FrTotDur_i}{TotDur} * 100$$

Where i is an index to each duration range defined by the histogram and TotDur is the total duration of the video in ms.

At step 34 a measure for each duration bin is computed such that it combines the normalised duration associated with the bin with the corresponding normalised total freeze duration according to the following mapping, $$T_i = 1/(F2(FrTotDurPercent_i)*F1(FrDurPercent_i)+F3(FrTotDurPercent_i))$$

$$F1(x1) = a1 + b1*\log(c1*x1+d1)$$

$$F2(x2) = a2*x2^2 + b2$$

$$F3(x2) = a3*x2^2 + b3$$

Where:
a1=5.767127; b1=−0.580342; c1=3.442218; d1=3.772878
a2=−0.00007; b2=−0.088499
a3=0.000328; b3=0.637424
log represents the natural logarithm function.
The value of each measure $T_i$ is then bound between [1,5]:

$$T_i' = \min(\max(T_i,1),5)$$

The measure $T_i$ has the property that it has a high correlation with the perceptual impact of the freeze events that have contributed to the ith bin in the histogram. The particular mapping described above has been found to provide good overall performance; however alternative mappings that exhibit a high correlation with the perceptual impact of the contributing freeze events could also be used.

Finally at step 35 the freeze frame parameter T1 is obtained by:

$$T1 = \min(T_i')$$

It will be understood by those skilled in the art that the processes described above may be implemented on a conventional programmable computer, and that a computer program encoding instructions for controlling the programmable computer to perform the above methods may be provided on a computer readable medium.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognised that various alterations, modifications, and/or additions may be introduced into the constructions and arrangements of parts described above without departing from the scope of the present invention as defined in the appended claims.

The invention claimed is:

1. A method of generating a freeze frame parameter relating to the perceptual impact of frozen frames in a video signal comprising the steps of:
   identifying frozen frames;
   identifying a freeze event comprising a plurality of consecutive frozen frames, the freeze event having a duration in dependence upon the number of frozen frames in the plurality of consecutive frozen frames;
   defining a set of duration ranges; and
   generating a freeze frame parameter in dependence upon the number of freeze events having a duration falling within each duration range.

2. A method according to claim 1, in which the step of generating a freeze frame parameter comprises the sub-steps of:
   determining a set of total durations comprising a total duration for each duration range by determining the total duration of all freeze events having a duration falling within said duration range; and
   generating said freeze frame parameter in dependence upon said set of total durations.

3. A method according to claim 2, in which the step of generating a freeze frame parameter in dependence upon said set of total durations comprises the sub-steps of:
   normalising each of said set to generate a normalised total duration in dependence upon the total duration of the video signal prior to generating said freeze frame parameter.

4. A method according to claim 3, in which the step of generating a freeze frame parameter in dependence upon said set of total durations comprises the sub-steps of:
   determining a set of candidate parameters comprising a candidate parameter $T_i$ for each duration range by determining the candidate parameter of all freeze events having a duration falling within said duration range in dependence upon said normalised total duration FrTotDurPercent$_i$ for said duration range;
   determining a dominant candidate parameter; and
   generating said freeze frame parameter in dependence upon said dominant candidate parameter.

5. A method according to claim 4 in which said candidate parameter $T_i$ is generated in dependence upon said normalised total duration FrTotDurPercent$_i$ and a normalised duration for each range FrtDurPercent$_i$ in accordance with the equation:

$$T_i = 1/(F2(FrTotDurPercent_i)*F1(FrDurPercent_i)+F3(FrTotDurPercent_i))$$

$$F1(x1) = a1 + b1*\log(c1*x1+d1)$$

$$F2(x2) = a2*x2^2 + b2$$

$$F3(x2) = a3*x2^2 + b3$$

where
a1=5.767127; b1=−0.580342; c1=3.442218; d1=3.772878
a2=−0.00007; b2=−0.088499
a3=0.000328; b3=0.637424
and
log represents the natural logarithm function.

6. A method according to claim 5, in which the candidate parameter $T_i$, is further bound to fall in the range between one and five.

7. A method according to claim 5, in which the step of determining the dominant parameter T1 is generated in accordance with the equation:

$$T1=\min(T_i^1).$$

8. A method of video signal quality assessment comprising the step of generating a quality measure in dependence upon a freeze frame measure, said measure being determined according to claim 1.

9. A method according to claim 8, further comprising the step of storing said video quality measure for visual display and analysis.

10. A non-transitory computer readable medium carrying a computer program for implementing the method according to claim 1.

11. An apparatus for video quality assessment comprising:

a processor for generating a quality measure;

a store for storing said quality measure;

wherein the processor is arranged in operation to generate the quality measure in accordance with claim 1.

12. An apparatus according to claim 11, further comprising means for analysis and visualisation of said quality measure.

* * * * *